(12) United States Patent
Herpin

(10) Patent No.: US 11,222,467 B2
(45) Date of Patent: Jan. 11, 2022

(54) METHODS AND SYSTEMS FOR EXTRACTING DATA FROM VIRTUAL REPRESENTATION OF THREE-DIMENSIONAL VISUAL SCANS

(71) Applicant: PREVU3D Technologies, Inc., Montreal (CA)

(72) Inventor: Maxime Herpin, Montreal (CA)

(73) Assignee: PREVU3D TECHNOLOGIES INC., Montreal (CA)

( * ) Notice: Subject to any disclaimer, the term of this patent is extended or adjusted under 35 U.S.C. 154(b) by 0 days.

(21) Appl. No.: 17/050,967

(22) PCT Filed: Sep. 19, 2019

(86) PCT No.: PCT/CA2019/051331
§ 371 (c)(1),
(2) Date: Oct. 27, 2020

(87) PCT Pub. No.: WO2021/051184
PCT Pub. Date: Mar. 25, 2021

(65) Prior Publication Data
US 2021/0264667 A1    Aug. 26, 2021

(51) Int. Cl.
*G06T 17/10*   (2006.01)
*G06K 9/00*    (2006.01)
*G06T 15/06*   (2011.01)
*G06T 17/20*   (2006.01)

(52) U.S. Cl.
CPC .......... *G06T 17/10* (2013.01); *G06K 9/00201* (2013.01); *G06T 15/06* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 7,301,535 B2 | 11/2007 | Shen | |
| 8,477,153 B2 | 7/2013 | Lin et al. | |
| 9,256,951 B2 | 2/2016 | Zygorchez et al. | |
| 9,600,892 B2 | 3/2017 | Patel et al. | |
| 2013/0202197 A1* | 8/2013 | Reeler | G06K 9/00201 382/154 |
| 2016/0133026 A1* | 5/2016 | Patel | H04N 13/204 382/154 |

FOREIGN PATENT DOCUMENTS

EP    3605459 A1 *    2/2020    ............. G06T 7/521

OTHER PUBLICATIONS

Written Opinion and International Search Report dated May 22, 2020, Application No. PCT/CA2019/051331.

* cited by examiner

*Primary Examiner* — Nurun N Flora
(74) *Attorney, Agent, or Firm* — The Dobrusin Law Firm, P.C.; Bryan S. Lemanski

(57) ABSTRACT

Methods and systems for extracting data from a three-dimensional visual representation of a physical space, the three-dimensional visual representation of the physical space comprising either a mesh of a plurality of polygons or point cloud data points. The present method includes the steps of defining an extraction polyhedron enclosed by a boundary surface, identifying data inside the boundary surface of the extraction polyhedron for extraction, extracting the data identified inside the boundary surface of the extracting polyhedron and storing the extracted data in data storage.

8 Claims, 8 Drawing Sheets

METHODS AND SYSTEMS FOR EXTRACTING DATA FROM VIRTUAL REPRESENTATION OF THREE-DIMENSIONAL VISUAL SCANS

FIELD

The present disclosure relates to software and apparatuses for editing virtual three-dimensional spaces that are accessible through a computing device. More specifically, the present disclosure relates to methods and systems for extracting and editing data from virtual representations of three-dimensional spaces that are based on scanned visual data.

BACKGROUND

Virtual and augmented reality technology has been applied to many industries resulting in innovative products that provide a number of advantages and efficiencies over more traditional methods that do not employ such emerging technologies.

For example, computer generated virtual reality environments have been readily embraced in disparate applications such as video games, flight and safety training and e-commerce, where a human subject can be virtually immersed in a computer-generated environment where the subject can interact and experience various aspects of the environment through a suitable user device in a "virtual" manner.

In manufacturing and industrial applications, interactive and virtual three-dimensional models of conventional floor plans are often generated for industrial and commercial facilities in order to plan how equipment is oriented, how a production line should be arranged, and how materials should be stored.

In the real estate and construction sector, floor plans and "mock-ups" are often created in order to visualize how an exterior or interior space will appear after a new construction or renovation project.

It will be readily appreciated that projects of this magnitude are typically quite complex and labor intensive, and as such the ability to plan and visualize these projects in a virtual way could foreseeably save these companies significant time, effort and financial resources while reducing the possibility of human injury or error.

Moreover, three-dimensional scans of physical environments are typically represented in the form of dense, three-dimensional point clouds which can, in some instances, be subsequently turned into polygonal (typically triangular) meshes. Three-dimensional representations based on both point cloud and polygonal meshes tend to involve large data sets which require substantial space in digital memory and as a result these data sets require heavy computational power to process. For example, the type of processing steps that may be required can include, but are not limited to, the removal of outliers from the data set, decimation of the data set, feature extraction from the data set, and semantic segmentation of the data set.

More specifically, in applications where visual scan data is represented in the form of polygonal meshes, data extraction can pose a particularly complex problem, as calculating the intersection between two polygonal meshes is typically done using Boolean operations which are generally computationally heavy and do not scale linearly with the size of the data set under consideration. On the other hand, in applications where visual scan data is represented in the form of a set of point cloud data points, it is desirable to focus the number of data points that must be considered for extraction in order to avoid iterating the entire data set to determine if a particular data point under consideration is to be extracted.

Therefore, it will be appreciated that when a data set is particularly large, visualizing a resulting three-dimensional scan that is based on that data set at suitably interactive framerates can become problematic to work with as these large data sets require that a user has access to significant computing resources.

Furthermore, the process of scanning a physical environment often results in capturing scan data that represents a larger area than what is required for the task at hand and accordingly only small parts of the acquired scan data are used at a time. As a result, it is desirable that a localised subset of the scan data can be extracted such that various manipulations can be performed on the extracted data set in a resource efficient manner.

BRIEF SUMMARY

The present disclosure can provide methods and systems that facilitate the extraction of a data subset from a larger data set that is acquired when three-dimensionally scanning a physical environment.

In at least one embodiment, the present disclosure can provide method and systems for extracting data from a three-dimensional visual representation of a physical space, the three-dimensional visual representation of the physical space comprising a first polygonal mesh of a plurality of polygons, the method comprising the steps of defining an extraction polyhedron enclosed by a boundary surface, the boundary surface of the extraction polyhedron enclosing at least a portion of the plurality of polygons, defining a second polygonal mesh that corresponds to the boundary surface of the extraction polyhedron, the second polygonal mesh having a plurality of polygons, identifying a plurality of planes, each of the plurality of planes being coplanar with a corresponding one of the plurality of polygons of the second polygonal mesh, each of the plurality of planes having at least one point and a direction vector, each point being coplanar with a corresponding one of the plurality of polygons of the second polygonal mesh, each direction vector corresponding with a normal of each corresponding plane of the plurality of planes of the second polygonal mesh, bisecting each one of the plurality of polygons of the first polygonal mesh that intersect with each at least one f the plurality of polygons of the second polygonal mesh with the corresponding plane of the corresponding at least one polygon of the second polygonal mesh, each intersecting one of the plurality of planes of the first polygonal mesh resulting in a corresponding at least a first interior polygon and a corresponding at least a second exterior polygon, testing each polygon of the plurality of polygons of the first polygonal mesh to determine if each polygon of the first polygonal mesh is an interior polygon, extracting each interior polygon, and storing, in data storage, data relating to each extracted interior polygon.

In at least one embodiment, the present disclosure can provide method and systems for extracting data from a three-dimensional visual representation of a physical space, the three-dimensional visual representation of the physical space comprising a plurality of point cloud data points, the method including the steps of defining an extraction polyhedron, the extraction polyhedron having a continuous perimeter edge including at least three co-planar points within the three-dimensional visual representation of the physical space, extruding the extraction polyhedron in an orthogonal direction to the extraction polyhedron to define a three-dimensional extraction volume enclosed by a boundary surface, the extraction polyhedron enclosing at least a portion of the point cloud data points, testing each of the plurality of the point cloud data points to determine if each of the plurality of point cloud data points are within the extraction polyhedron, and if at least one of the plurality of the point cloud data points are within the extraction polyhedron, extracting the at least one of the plurality of the point cloud data points, and storing the at least one of the plurality of the point cloud data points in data storage.

DESCRIPTION OF THE DRAWINGS

The description of the present disclosure will be better understood when read in connection with the following FIGURES, in which.

DETAILED DESCRIPTION OF THE EMBODIMENTS

Figure 1:
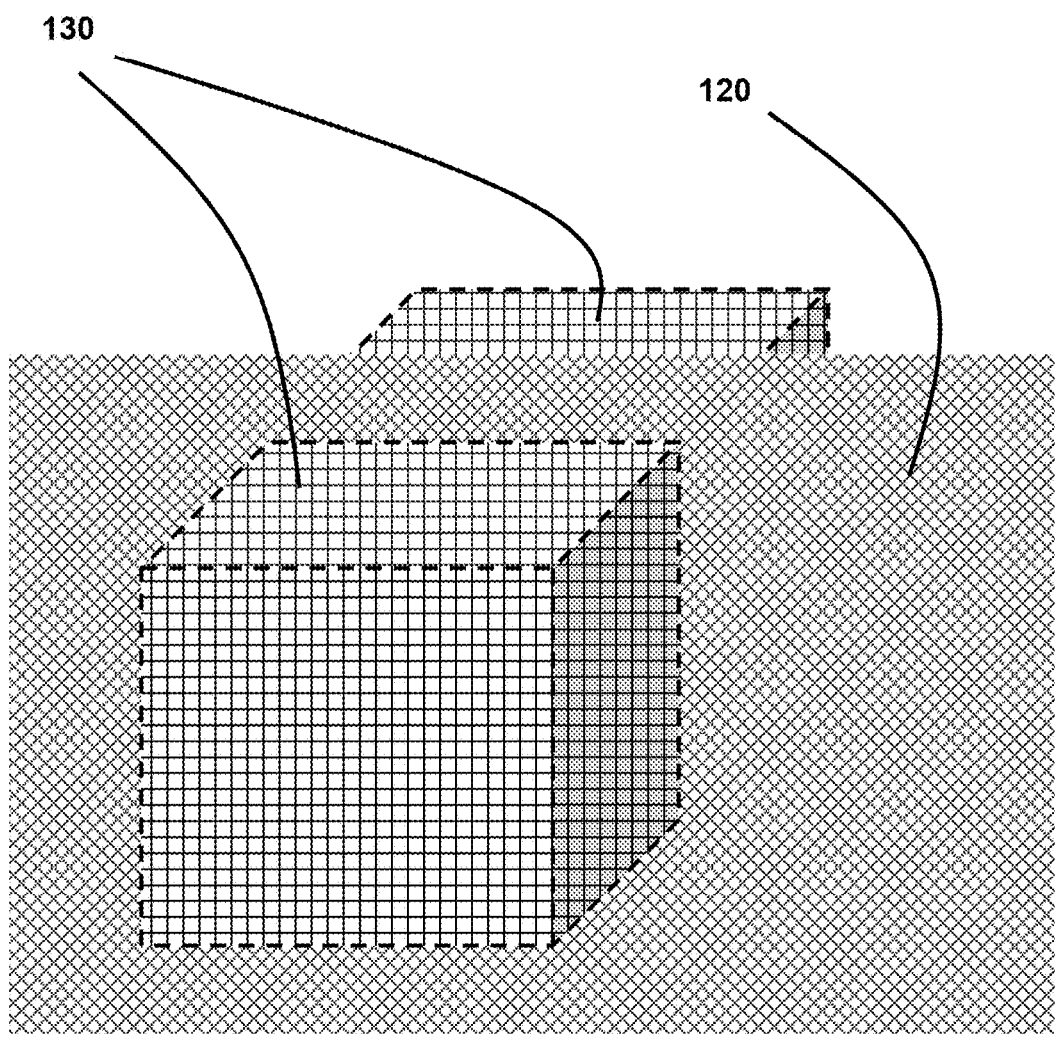
FIG. 1 is an illustration of an extraction polyhedron intersecting with a first polygonal mesh that visually represents a space in accordance with at least one embodiment of the present disclosure.

In accordance with the embodiments of the present disclosure described herein, methods and systems are provided that facilitate the extraction of a data subset from a larger data set that is acquired when three-dimensionally scanning a physical environment.

In at least one embodiment, that the present method is used to perform data extraction and scales linearly in time and size with the size of the data set and does not require complex data structures.

In the context of the present disclosure a "user device" can be any suitable electronic device with appropriate capabilities, including but not limited to a smartphone, laptop, tablet, desktop, server or a wearable device (such as a virtual, augmented or extended reality device), as required by the end user application of the present disclosure. As will be appreciated by the skilled person, a suitable user device will have both visual display means and user input means that permit a user to access, edit, navigate and manipulate an interactive and editable three-dimensional map as required.

As will be appreciated by the skilled person, a suitable user device will be in electronic communication with suitable data storage means as discussed herein. In some embodiments the user device has local data storage means and in other embodiments the user device additionally or alternatively will be in electronic communication with remotely located data storage means over an electronic communication network.

To this point, embodiments of the present disclosure can be executed over an electronic communication network such as a local or wide area network as required by the end-user application. As such, suitable data storage may be provided that can be located remotely (i.e. in the cloud and electronically accessed via typical wireless communication protocols) or in a locally oriented server stored onsite or in local storage on the user device and electronically accessed by way of standard wired or wireless communication protocols, as required by the end user application of the present disclosure.

It will further be appreciated by the skilled person that in some embodiments a suitable user device can be adapted and configured to run a suitable graphics engine that is suitable for rendering and displaying an interactive and editable three-dimensional map in accordance with the present disclosure.

In other embodiments, embodiments of the present disclosure can be accessed by a suitable user device through a web browser having access to a suitable electronic communication network, such as the Internet or a local area network.

In the context of the present disclosure, it will be appreciated that a suitable scanning device can include any suitable three-dimensional scanning device that is adapted to obtain and convert visual data into a suitable format of digital scan data. For example, a suitable scanning device includes but is not limited to a digital camera, a structured light scanner, a photogrammetry workflow, a structure from a motion capture scanner, a simultaneous localization and mapping (SLAM) scanner, a light field camera and a LIDAR scanner among other suitable and available three-dimensional scanning devices that will be readily appreciated by the skilled person. Other suitable devices could include a suitably equipped unmanned aerial vehicle ("UAV", i.e.: a drone), as will be appreciated by the skilled person.

It will further be appreciated that in some embodiments a suitable scanning device can be in electronic communication with suitable data storage means over the electronic communication network. In other embodiments the suitable scanning device has suitable local storage, as will be appreciated by the skilled person.

In the context of the present disclosure, it will be appreciated that "scan data" includes any suitable format of digital data that is obtained by a suitable scanning device as discussed herein in order to visually represent a physical space or a physical asset in a digital manner for future storage, editing and display. In some embodiments, scan data can be point cloud data and/or mesh data, depending on the needs of the end user application.

In the context of the present disclosure, it will be appreciated that a "space" includes any interior or exterior environment that is being digitally scanned in connection with the present disclosure. In at least one embodiment, a suitable space will include but is not limited to a factory, a section of a port or a building, a residential property, a commercial property, among any other suitable interior or exterior setting that is contemplated for use in connection with the present disclosure. It is contemplated that a suitable space can be captured as a single scan or as an aggregate of a plurality of scans, depending on the needs of the embodiments of the present disclosure.

In at least one embodiment, methods and systems are provided for extracting data from three-dimensional scan data that can be represented in a suitable three-dimensional visual format. In some embodiments, the suitable three-dimensional visual format can be at least one of a point cloud visual representation and a polygonal mesh visual representation, as will be readily appreciated by the skilled person.

In the context of the present disclosure, a "mesh" or a "polygonal mesh" will be understood to be a mesh of polygons that can be oriented to represent a three-dimensional space in a visual format in a computing graphical environment. In the context of the present disclosure, a polygon can be considered any enclosed shape, whether symmetrical or not, and having any number of edges that can be curved or straight. In some embodiments, it will be understood that a polygon is planar. In many embodiments, the polygons that comprise the mesh under consideration will be triangles. In the context of the present disclosure, a "manifold polygonal mesh" indicates that every polygon in the mesh under consideration abuts at least one neighbouring polygon and shares at least one common "manifold" edge with a corresponding adjacent polygon, as will be understood by the skilled person.

In the context of the present disclosure, a "point cloud" or a "point cloud data set" will be understood to be a plurality of point cloud data points that can be oriented to represent a three-dimensional space in a visual format in a computing graphical environment.

In at least one embodiment, the data subset to be extracted is defined by the data that is enclosed within a volume defined by a boundary surface of an extraction polyhedron. In other embodiments, the data subset to be extracted from the three-dimensional visual representation of the physical space can be defined using a parametric function. As will be appreciated by the skilled person, the choice of a suitable parametric function will depend on the type of visual representation that is under consideration. In embodiments where the three-dimensional visual representation is based on a data set of point cloud data points as discussed herein, a suitable parametric function could include, for example, a condition over the height of each point. In other embodiments where the three-dimensional visual representation is based on a polygonal mesh, a suitable parametric function could include a test over the area of each polygon that makes up the polygonal mesh.

In other embodiments, the data to be extracted can be defined as an intersection between the particular data points under consideration and an extraction polyhedron that is defined by a manifold polygonal mesh. In these embodiments, the intersection can be defined as follows: for a point cloud representation, the extracted data can be defined as the set of all the points of the cloud that are inside the boundary surface of a defined extraction polyhedron.

As will be understood by the skilled person, a suitable extraction polyhedron can be considered to be any suitable three-dimensional shape that encloses a particular area that is defined by a suitable boundary surface. In some embodiments, the extraction polyhedron can be generated by extruding an extraction polygon in an orthogonal direction to the plane that contains the generally planar initial extraction polygon, as will be discussed in further detail herein. In this way, a suitable extraction polyhedron can be defined where suitable data can be enclosed within the boundary surface of the extraction polyhedron in order to define the data that the user wishes to extract from overall data set that defines the three-dimensional visual representation of the physical space.

In embodiments that employ a polygonal mesh to visually represent the physical space, the extracted data can be defined such that any point on the surface of any polygon that is contained within the boundary surface of the extraction polyhedron can be defined as a data point to be extracted. However, it will be appreciated that a number of polygons will be bisected by the boundary surface of the extraction polyhedron, and as such it will be required to calculate the portions of the polygon that are inside and outside the boundary surface of the extraction polyhedron may need to be calculated as discussed in further detail below.

In other embodiments, the user can also identify data points that the extracting polyhedron and associated boundary surface should contain, and in these embodiments the extraction polyhedron is a convex hull that contains the user defined data points for extraction. After identifying the points, the user can move them in the three-dimensional visual representation of the space to refine the extraction volume.

In at least one embodiment, the present method can be executed as follows:

Defining the Extraction Polyhedron within the Three-Dimensional Visual Representation of the Physical Space This step can be completed in a number of ways depending on the level of control required by the user over the eventual shape of the extraction polyhedron that will enclose the data points to be extracted from the three-dimensional visual representation of the physical space. As discussed herein, a data set of scan data represents the three-dimensional visual representation of the physical space and the user wishes to extract some of these data points that visually represent the physical space.

In some embodiments, the user can identify a plurality of points within the three-dimensional visual representation of the physical space in order to define ern initial extraction polygon. In at least some embodiments, this initial extraction polygon can be planar and all of the user-identified points are therefore co-planar, although other arrangements are also contemplated.

Next, this initial extraction polygon can be extruded in an orthogonal direction to the plane containing the initial extraction polygon to generate an extraction polyhedron that is defined by a boundary surface that encloses the data points to be extracted.

With reference to FIG. 1, one embodiment of the present method is illustrated wherein the initial extraction polygon is a square that is extruded in an orthogonal direction to result in a prismatic extraction polyhedron 130. In this embodiment, the physical space is visually represented by a first polygonal mesh 120 that is made up of a number of polygons that in this embodiment are squares. As can be seen in FIG. 1, the boundary surface of the extraction polyhedron 130 encloses at least one polygon of the first polygonal mesh 120 and therefore the extraction polyhedron 130 encloses data points to be extracted. Moreover, in this embodiment the boundary surface of the extraction polyhedron 130 is similarly represented by a second polygonal mesh that is made up of a number of polygons that in this embodiment are squares.

Once the desired extraction polyhedron is identified, the extracting procedure begins as discussed next and with the data points contained within the boundary surface of the extraction polyhedron as an input for extraction.

In embodiments where the three-dimensional visual representation of the physical space is represented by a first polygonal mesh, the following steps can be employed to extract data that is contained within the boundary surface of the identified extraction polyhedron.

Identifying Planes That Define the Boundary Surface of the Extraction Polyhedron It will be appreciated that the boundary surface of the extraction polyhedron can also be represented as a second polygonal mesh of a plurality of polygons in an analogous manner to the physical space that is being visually represented by the first polygonal mesh.

Accordingly a co-planar plane can be defined for each of the polygons that make up the second polygonal mesh of the boundary surface of the extraction polyhedron. In this way, a plurality of defined planes will define the boundary surface of the extraction polyhedron as a set of planes.

It will be appreciated that a plane is a flat two-dimensional surface that separates a three-dimensional space into two subsets—one on either side of the defined plane. In some embodiments, a plane may be defined by a point and a direction vector. In these embodiments, the point is any point that is on the plane, and the direction vector is the normal of (i.e. an orthogonal vector to) the plane.

In embodiments where the three-dimensional visual representation of the physical space and the boundary surface of the extraction polyhedron are each represented by a polygonal mesh, a plane can be identified for each of the constituent polygons that make up the boundary surface of the extraction polyhedron as discussed above. In these embodiments, multiple polygons can be on the same defined plane, and as such there is not necessarily a 1:1 polygon-to-plane ratio.

Identifying Data that is Inside and Outside the Extraction Polyhedron

In at least one embodiment, this step is completed using a polygonal mesh that is comprised of plurality of polygons that are triangles. In other embodiments, meshes that are comprised of non-triangular polygonal meshes that can be "triangulated" using any known methods such as ear clipping or horizontal decomposition in order to approximate a polygonal mesh that is comprised of plurality of polygons that are triangles, as will be readily understood by the skilled person.

In order to "cut" the first polygonal mesh of the physical space to extract data, any polygons that make up the first polygonal mesh of the space and which intersect the boundary surface of the extraction polyhedron will need to be "cut", or in other words, visually separated into parts of the intersecting polygons that are inside the boundary surface of the extraction polyhedron and parts of the triangles that are outside of the boundary surface of the extraction polyhedron.

Figure 2A:
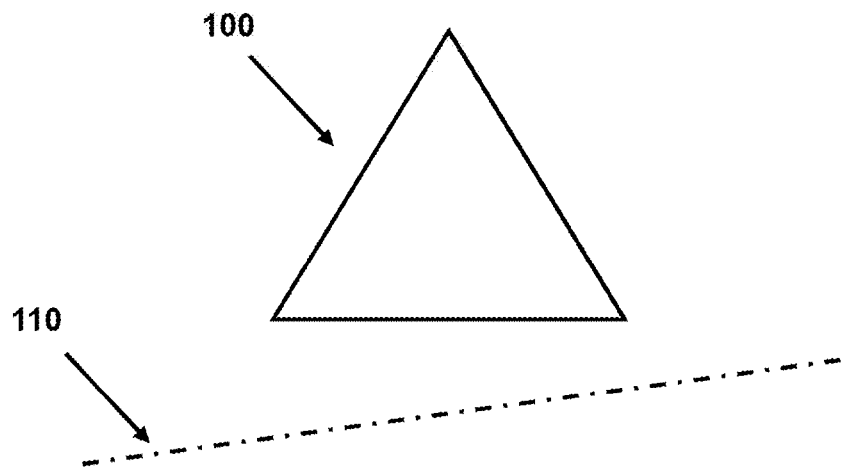
FIG. 2A is an illustration of a polygon that is not bisected by a defined plane in accordance with at least one embodiment of the present disclosure.
Figure 2B:
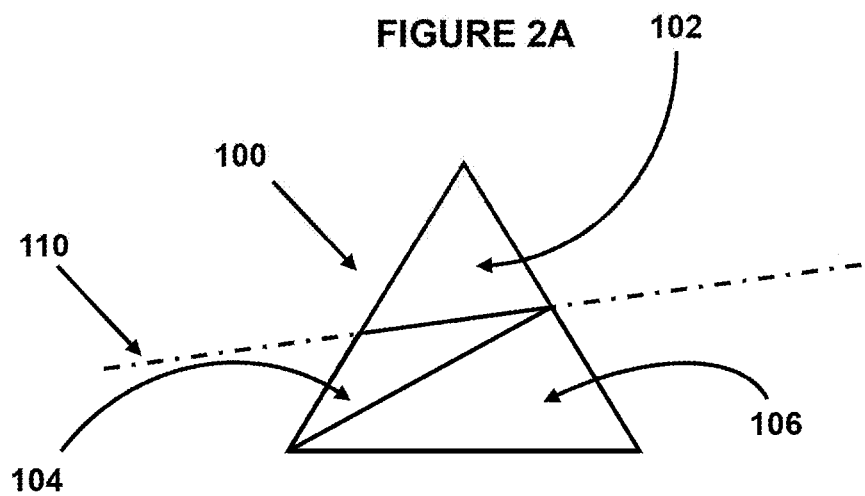
FIG. 2B is an illustration of a polygon that is bisected by a defined plane in accordance with at least one embodiment of the present disclosure.

As discussed herein, in at least one embodiment, the polygons that make up the first polygonal mesh of the physical space are triangles. When cutting a triangle with a plane, it will be appreciated that there are two cases, as can be seen in FIGS. 2A and 2B: Either the primary triangle 100 that makes up the polygonal mesh does not intersect the plane 110, as can be scene in FIG. 2A, in which case the cut operation is terminated, or the primary triangle 100 that makes up the polygonal mesh intersects the plane 110 as can be seen in FIG. 2B, in which case the triangle is replaced by three new triangles 102, 104, 106 such that the union of all three triangles 102, 104, 106 form the original triangle 100, and one triangle 102 is entirely on one side of the plane 110 while the other two triangles 104, 106 are entirely on the other side of the plane 110. If the original triangle 100 contains color information in its vertices, it is contemplated that the color information can be copied to the new triangles 102, 104, 106 using linear interpolation of the colors. In this way, cutting a mesh with a plane modifies the topology of the mesh so that no triangle intersects the plane, and no visual change is made to the data.

Figure 3:
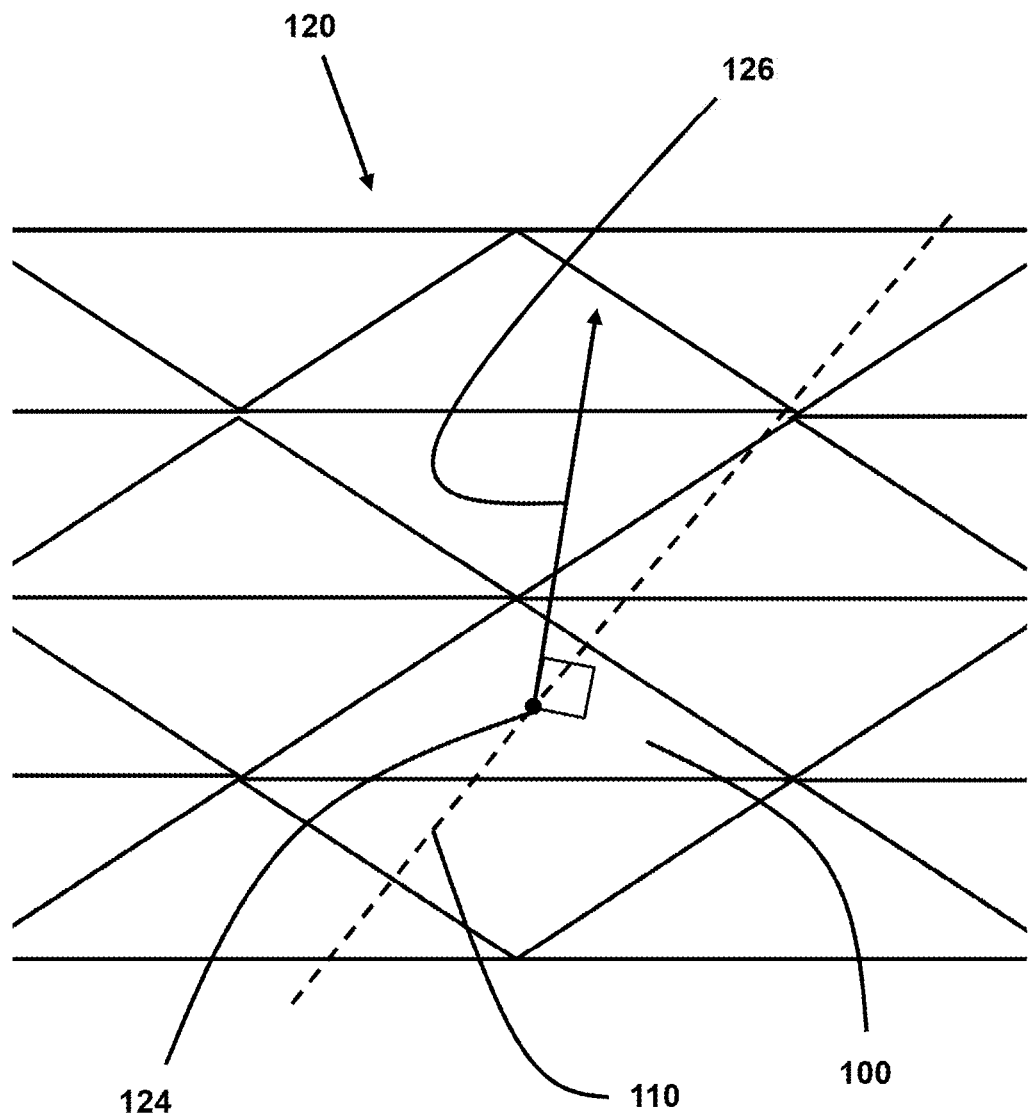
FIG. 3 is an illustration of a plane bisecting the intersecting polygons of a first polygonal mesh that visually represents a space in accordance with at least one embodiment of the present disclosure.

Turning to FIG. 3, it can be seen that the first polygonal mesh 120 is made up of a plurality of polygons that, in this embodiment, are triangles 100. Moreover, a plane 110 can be defined by way of a point 124 on triangle 100 and a normal vector 126 that is oriented in an orthogonal manner to triangle 100. In this way, plane 110 bisects triangle 100 into triangles that are on a first side of plane 110 and a second side of plane 110, as will be appreciated by the skilled person.

Extracting Data From Inside the Extraction Polyhedron

After the previous step, all triangles that make up the first polygonal mesh of the space (including any triangles that have been bisected into smaller constituent interior and exterior triangles) have been identified as either entirely inside the boundary surface of the extraction polyhedron, or entirely outside the boundary surface of the extraction polyhedron. It will subsequently be appreciated that in order to test if a particular triangle that is part of the first polygonal mesh of the space is inside or outside the boundary surface of the extraction polyhedron is therefore the same as testing whether any point on the surface of a triangle (excluding the edges of the triangle) are contained inside the boundary surface of the extraction polyhedron.

In at least one embodiment, testing if any point that comprises the first polygonal mesh is inside or outside the boundary surface of the extraction polyhedron can be achieved by identifying the number of intersections between a ray originating from the point being tested and the boundary surface of the extraction polyhedron along a line that is oriented in a random direction. If the number of these intersections is odd, the point can be determined to be inside the boundary surface of the extraction polyhedron. If the number of these intersections is even, the point can be determined to be outside the boundary surface of the extraction polyhedron.

In this way, all polygons that comprise the first polygonal mesh that are located inside the boundary surface of the extraction polyhedron can subsequently be extracted, thereby representing the extracted data.

Visually Replacing Extracted Data

Once the extracted data has been extracted it can subsequently be modified in any way the user sees fit. Such modifications may include, but are not limited to, complete displacement of the extracted data, storage of the extracted data in a suitable database and/or deletion of the extracted data, which could foreseeably create challenges if the original data set that makes up the three-dimensional representation of the physical space now lacks this extracted data.

In these situations, a visual "hole" in the three-dimensional representation of the physical space is created upon the extraction of the extracted data. In order to prevent the user from seeing the hole created by the absence of the extracted data, the hole that is created by the absence of the extracted data can therefore be filled in this step. In at least some embodiments, the present hole-filling step obtains an input in the form of the boundary of the hole, or in other words the boundary of the extracted data. In at least one embodiment, the boundary of the hole can be described as the intersection between the boundary surface of the extraction polyhedron and the surface of the data that makes up the three-dimensional representation of the physical space before extraction.

In these embodiments, the boundary of the hole can be saved as a subset of the edges of the polygons that were "cut" in order to define the extracted data. As a result, these edges (and any suitable data that is associated with these edges) can be recovered without additional computation being necessary in the extraction step. In these embodiments, the boundary can be first reorganised in multiple ordered sets so that each set is a closed polygon representing the hole that was created in the previous step. In these embodiments, each polygon can then subsequently be filled using any of the known techniques such as, but not limited to, ear clipping or horizontal decomposition.

In embodiments where the boundary of the hole (or in other words, the edge of the extracted data) contained color information, the filling polygons that replace the extracted data can have color information that is interpolated from the colors located at the boundary of the hole. In these embodiments, the filling polygons that replace the extracted data are added to the scan data at the end of this step. In this way, in some embodiments the present method can generate a number of data sets including, but not limited to: the data subset of the extracted data, the data subset that makes up the three-dimensional visual representation of the space without the extracted data, and the data subset that makes up the three-dimensional visual representation of the space with the extracted data replaced with interpolated, hole-filling polygons. As such, each of these data subsets can be processed independently and efficiently for different processes as required by the end user application of the present disclosure.

Extraction of Point Cloud Data

In embodiments where the three-dimensional visual representation of the physical space is comprised of point cloud data points, each data point that comprises the point cloud can be tested to determine whether that particular data point is either inside or outside the boundary surface of the extraction polyhedron, and the set of data points that are identified as being inside the boundary surface of the extraction polyhedron can be subsequently extracted as a point cloud of data points. In some embodiments, a polygonal mesh may also be present, and as such the overlapping portion of the polygonal mesh that is identified as being inside the boundary surface of the extraction polyhedron can also be extracted to form part of the extracted data set, as discussed herein.

In this way, scan data that comprises the three-dimensional visual representation of the space in the form of a point cloud, a polygonal mesh, or both, can be extracted by a user using intuitive and minimal user interaction in a fast and robust manner, thereby resulting in a subset of extracted data of the original data that is easier to process. Moreover, the modified data can be generated to fill and avoid any visible "holes" in the three-dimensional visual representation of the space.

EXAMPLES

Figure 4A:
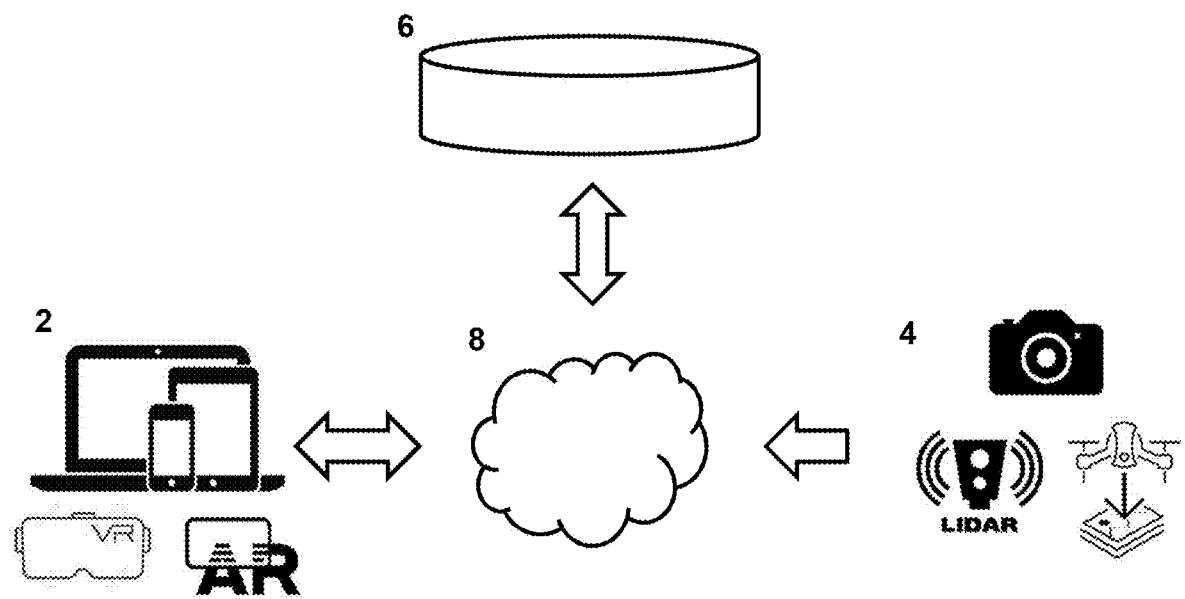
FIG. 4A is an illustration of a suitable system for use in accordance with at least one embodiment of the present disclosure.

Turning to FIG. 4A, at least one embodiment of a system for use in connection with the present disclosure is illustrated. In this embodiment, a user device 2, a scanning device 4 and data storage 6 are in electronic communication by way of an electronic communication network 8. In one embodiment user device 2 has visual display means and user interface means, as discussed herein. In one embodiment, that a scanning device 4 can be, for example a digital camera, a LIDAR scanner or a UAV-based scanner and that data storage 6 is a remotely located server.

It is further contemplated that user device 2, scanning device 4 and data storage 6 are in electronic communication with each other through an electronic communication network 8 that is a wireless communication network operated through remote servers, also known as a cloud-based network, although other arrangements such as hard-wired local networks are also contemplated as discussed herein.

Figure 4B:
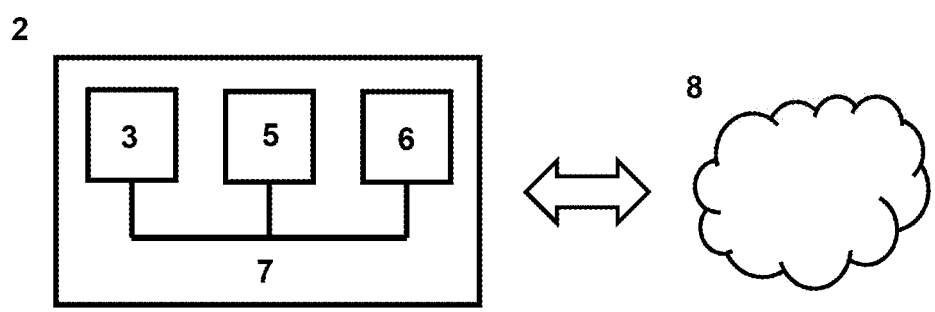
FIG. 4B is an illustration of a suitable user device for use in accordance with at least one embodiment of the present disclosure.

Turning to FIG. 4B, at least one embodiment of user device 2 for use in connection with the present disclosure is illustrated. In this embodiment, user device 2 includes a processor 3, a communication subsystem 5 and local data storage 6, all of which are electronically connected by way of a bus 7. Communication subsystem 5 enables wireless electronic communication with electronic communication network 8, although other wired embodiments are also contemplated.

Figure 5:
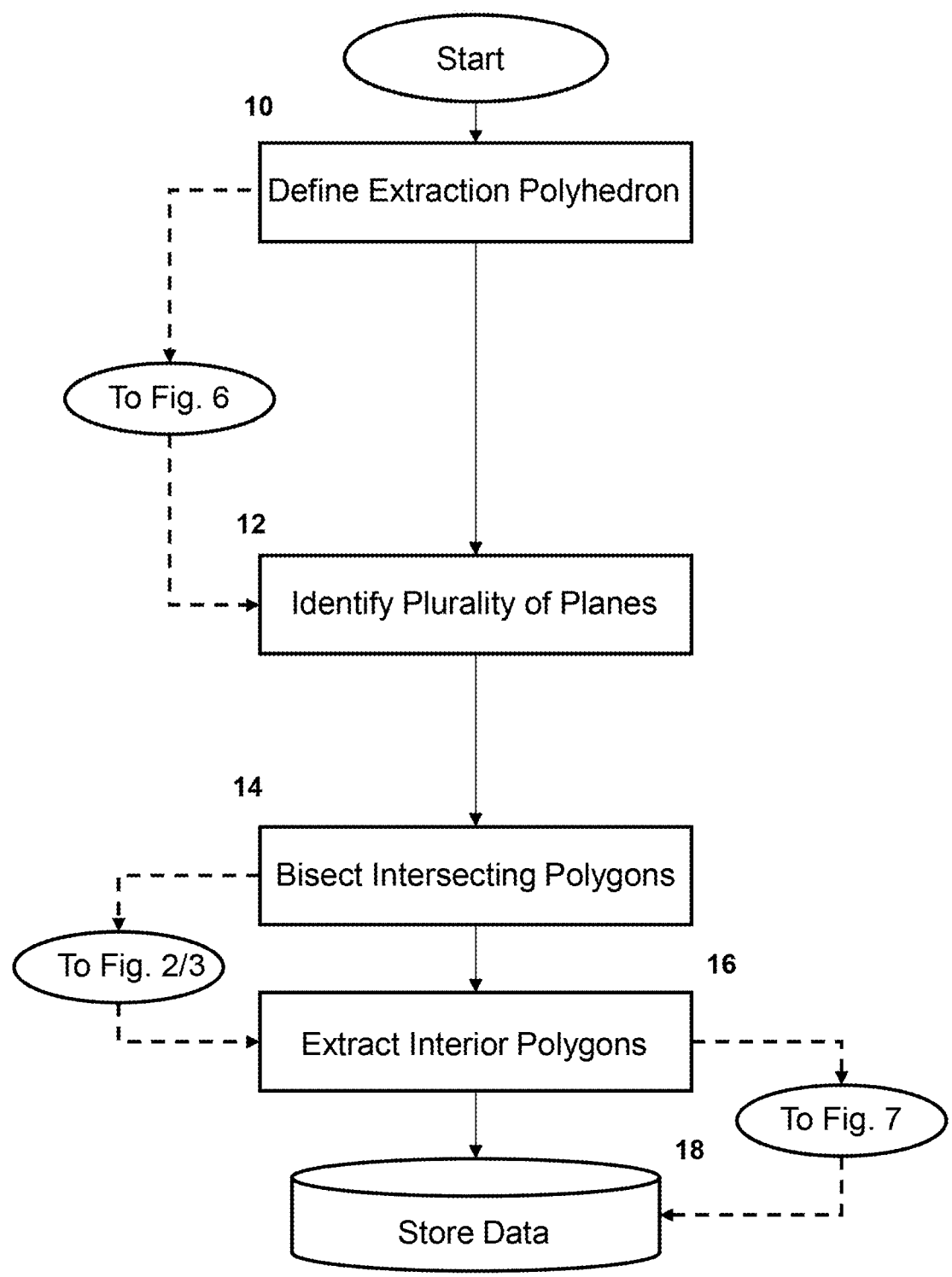
FIG. 5 is a process diagram of a method for extracting data from a three-dimensional visual representation of a physical space in accordance with one embodiment of present disclosure.

Turning to FIG. 5, at least one embodiment of the present method is illustrated. In this embodiment, the method is adapted for extracting data from a three-dimensional visual representation of a physical space where the three-dimensional visual representation of the physical space is a first polygonal mesh of a plurality of polygons that, in this embodiment, are triangles.

Figure 6:
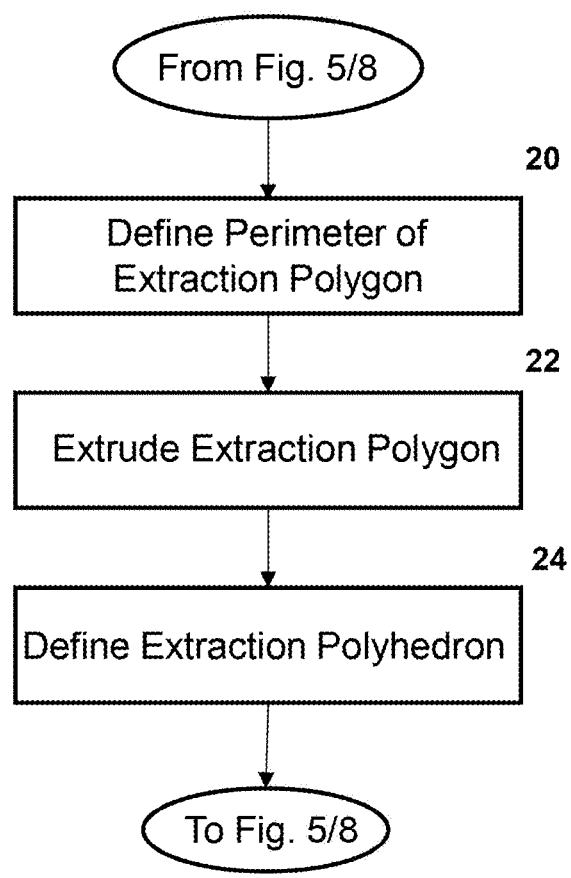
FIG. 6 is a process diagram of a method for defining an extraction polyhedron in accordance with one embodiment of present disclosure in accordance with the methods of FIGS. 3 and 6.

In this embodiment, the present method begins with the definition of an extraction polyhedron having a boundary surface 10. As will be discussed in further detail in relation to FIG. 6, the extraction polyhedron and accompanying boundary surface can be defined in a number of ways. With reference to FIG. 1 and FIG. 6, in at least one embodiment, the extraction polyhedron 130 is a user-defined extraction polygon 20 having a continuous perimeter and which is extruded in an orthogonal direction 22 to define an extraction polyhedron 130 that is enclosed by a boundary surface 24. As discussed herein, the initial extraction polygon can be any suitable shape and can be defined in any number of ways provided that the perimeter is a continuous perimeter. In at least one embodiment, that extraction polygon is generally planar, however other arrangements are also contemplated.

In this way, the extraction polyhedron 130 encloses a virtual volume of space within the three-dimensional visual representation of the physical space. It is further contemplated that the boundary surface of the extraction polyhedron can be defined as a second polygonal mesh that is comprised of a plurality of polygons. In at least one embodiment, the boundary surface of the extraction polyhedron 130 encloses at least one polygon that from the first polygonal mesh that makes up the three-dimensional visual representation of the physical space, as can be seen in FIG. 1.

Turning back to FIG. 5, once the extraction polyhedron and accompanying boundary surface is defined 10 and represented as a second polygonal mesh, the boundary surface of the extraction polyhedron fully encloses or at least intersects at least one polygon from the first polygonal mesh. It is next contemplated that the method will identify a plurality of planes 12 wherein each one of the plurality of planes are co-planar with each of the polygons from the second polygonal mesh that defines the boundary surface of the extraction polyhedron. In this way, the boundary surface of the extraction polyhedron can be defined by a set of defined planes in order to determine how to "cut" the first polygonal mesh that that makes up the three-dimensional visual representation of the physical space.

In this embodiment, each plane has a point (located on a that plane) and a normal (i.e. orthogonal) vector associated with it. In at least one embodiment, it is contemplated the point is common with the corresponding co-planar polygon from the second polygonal mesh. In this way, a plane can be defined for each polygon that defines the boundary surface of the extraction polyhedron. In some embodiments, it will be understood that a single defined plane may correspond to more than one polygon of the second polygonal mesh, as multiple polygons may be aligned with one another, yet separated by a physical space, for example.

With reference to FIG. 5, once a plane has been defined for each corresponding co-planar polygon from the second polygonal mesh that defines the extraction polyhedron, each polygon of the first polygonal mesh (which in this case are triangles) that is fully within or at least intersects the boundary surface of the extraction polyhedron can subsequently be bisected by any intersecting planes 14, as also seen in FIGS. 2 and 3. In this way, any intersecting triangles that make up the first polygonal mesh will be divided by the intersecting plane into triangles that are on one side of the plane and on the opposing side of the plane. In the context of the present disclosure, if the intersecting plane defines the boundary surface of the extraction polyhedron and as a result triangles on one side of the intersecting plane will be within the boundary surface of the extraction polyhedron and will need to be extracted, and triangles on the opposing side of the intersecting plane will be outside of the boundary surface of the extraction polyhedron and can be left in place, as can also be seen in FIGS. 2 and 3. Therefore, once this step is complete, the present method will have determined where exactly to "cut" the first polygonal mesh to align with the boundary surface of the extraction polyhedron and as a result will be able to determine which polygons from the first polygonal mesh should be extracted from the first polygonal mesh.

Figure 7:
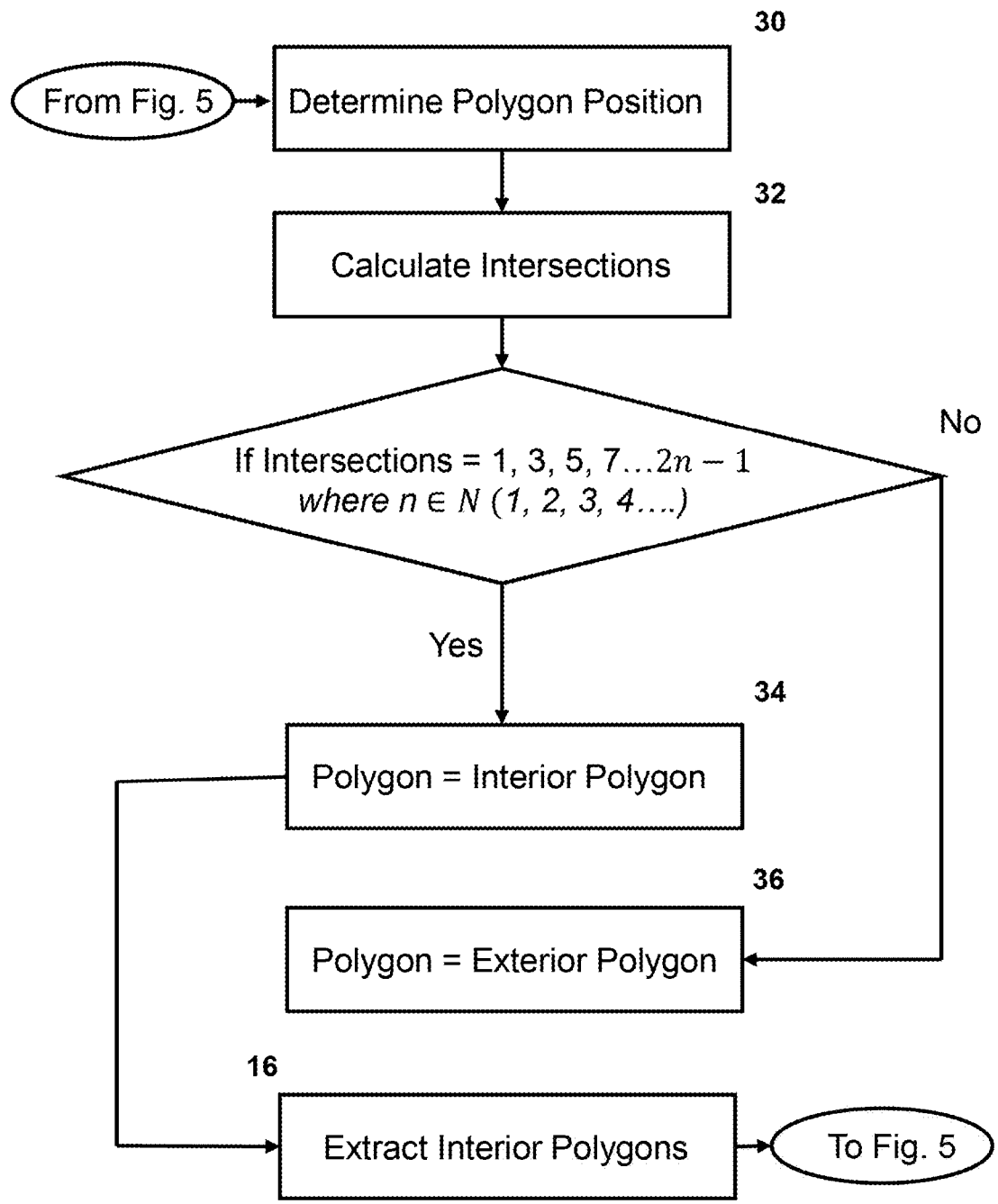
FIG. 7 is a process diagram of a method for determining whether a polygon is inside a defined extraction polyhedron in accordance with the method of FIG. 5.

With reference to FIG. 7, in some embodiments each polygon in the first polygonal mesh that visually represents the space can be tested in order to determine if each polygon that makes up the first polygonal mesh is inside or outside the boundary surface of the extraction polyhedron. In this way, the present method can automatically detect whether a polygon that is part of the first polygonal mesh needs to extracted (as it is within the boundary surface of the extraction polyhedron) or left in place (as it is outside the boundary surface of the extraction polyhedron).

In this embodiment, the position of a polygon of the first polygonal mesh can be determined 30 by calculating the number of intersections 32 between a randomly selected vector that emanates from a point on the surface of a particular polygon of the first polygonal mesh and the boundary surface of the extraction polyhedron. In this embodiment, a check is performed to determine if the number of these calculated intersection is odd (i.e. 1, 3, 5, 7 . . . 2n−1 where n∈N (1, 2, 3, 4 . . . )), and if this is the case the polygon of the first polygonal mesh can be determined to be an internal polygon 34. On the other hand, if the number of these calculated intersection is even, the polygon of the first polygonal mesh can be determined to be an external polygon 36 and can subsequently be ignored.

Once the internal polygons of the first polygonal mesh have been determined, the internal polygons can be extracted 16 and stored in suitable data storage.

Figure 8:
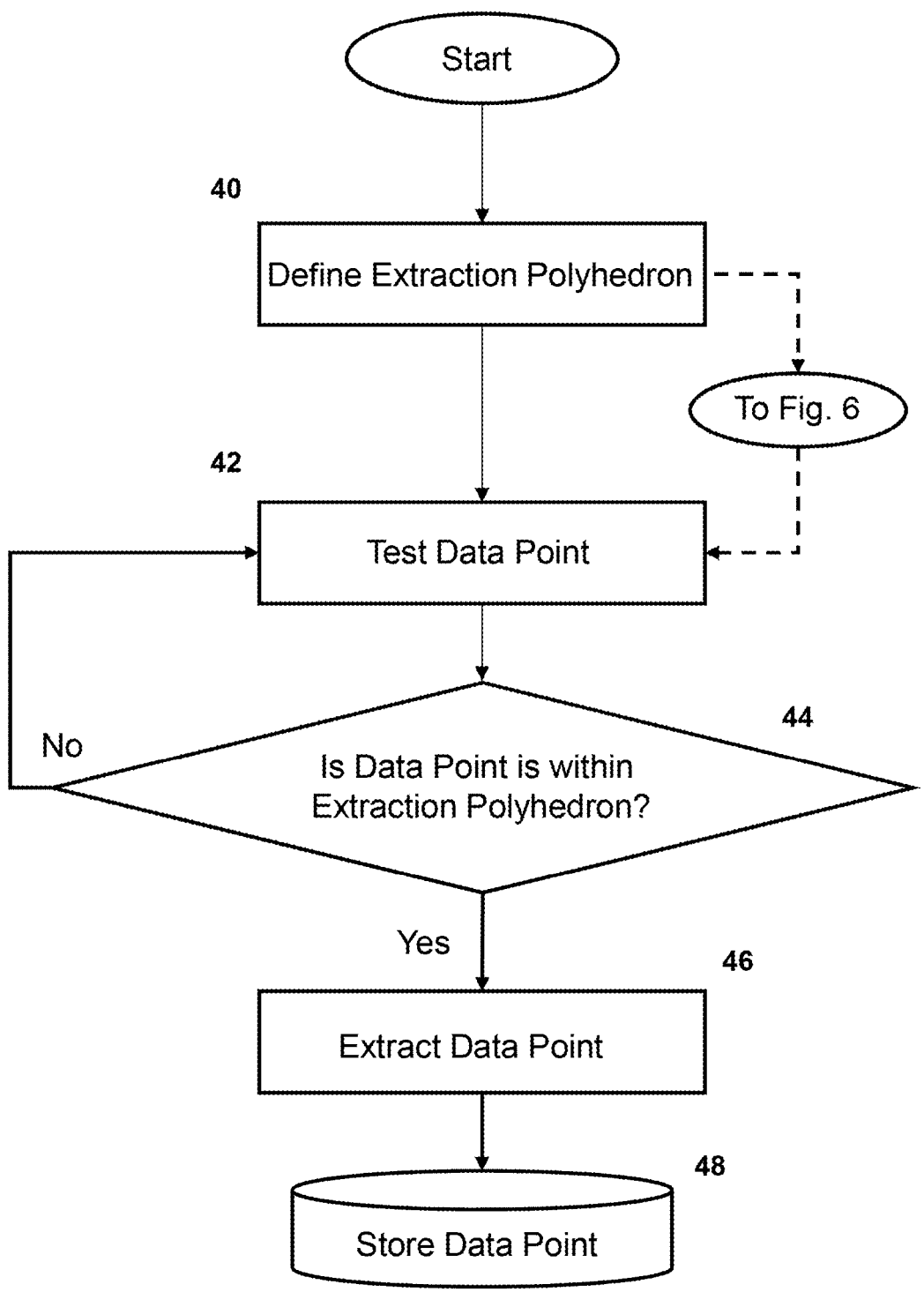
FIG. 8 is a process diagram of a method for extracting data from a three-dimensional visual representation of a physical space in accordance another embodiment of present disclosure.

With reference to FIG. 8, another embodiment of the present method is illustrated. In this embodiment, the method is adapted for extracting data from a three-dimensional visual representation of a physical space where the three-dimensional visual representation of the physical space is a point cloud of data points.

In this embodiment, an extraction polyhedron having a boundary surface can be defined 40 as discussed above in connection with FIG. 6. Next, each data point that makes up the point cloud can be tested 42 to determine if the data point is located within the boundary surface of the extraction polyhedron 44 or outside the boundary surface of the extraction polyhedron.

Next, the identified interior data points can be extracted 46 and subsequently stored in a suitable data storage 48.

The embodiments described herein are intended to be illustrative of the present compositions and methods and are not intended to limit the scope of the present disclosure. Various modifications and changes consistent with the description as a whole and which are readily apparent to the person of skill in the art are intended to be included. The appended claims should not be limited by the specific embodiments set forth in the examples but should be given the broadest interpretation consistent with the description as a whole.

What is claimed is:

1. A method for extracting data from a three-dimensional visual representation of a physical space, the three-dimensional visual representation of the physical space comprising a first polygonal mesh of a plurality of polygons, the method comprising:

defining an extraction polyhedron enclosed by a boundary surface, the boundary surface of the extraction polyhedron enclosing or intersecting at least a portion of the plurality of polygons;

defining a second polygonal mesh that corresponds to the boundary surface of the extraction polyhedron, the second polygonal mesh having a plurality of polygons;

identifying a plurality of planes, each of the plurality of planes being coplanar with a corresponding one of the plurality of polygons of the second polygonal mesh, each of the plurality of planes having at least one point and a direction vector, each point being coplanar with a corresponding one of the plurality of polygons of the second polygonal mesh, each direction vector corresponding with a normal of each corresponding plane of the plurality of planes of the second polygonal mesh;

bisecting each one of the plurality of polygons of the first polygonal mesh that intersect with each at least one of the plurality of polygons of the second polygonal mesh with the corresponding plane of the corresponding at least one polygon of the second polygonal mesh, each intersecting one of the plurality of planes of the first polygonal mesh resulting in a corresponding at least a first interior polygon and a corresponding at least a second exterior polygon;

testing each polygon of the plurality of polygons of the first polygonal mesh to determine if each polygon of the first polygonal mesh is an interior polygon;

extracting each interior polygon; and storing, in data storage, data relating to each extracted interior polygon.

2. The method of claim 1, wherein defining an extraction polyhedron further comprises:
   placing a plurality of points within the first polygonal mesh, the plurality of points defining an extraction polygon; and
   extruding the extraction polygon along a normal of a plane that is at least approximately coplanar with the extraction polygon thereby generating an extraction polyhedron.

3. The method of claim 1, wherein testing each polygon of the plurality of polygons of the first polygonal mesh to determine if each polygon of the first polygonal mesh is an interior polygon:
   calculating a number of intersections between a ray projecting outwardly from a point and the second polygonal mesh, each point being coplanar to each corresponding polygon of the first polygonal mesh and within a perimeter of each corresponding polygon of the first polygonal mesh, and
   if the number of intersections is odd, determining that the corresponding polygon of the first polygonal mesh is an interior polygon.

4. The method of claim 1, wherein each of the plurality of polygons of the first polygonal mesh, each of the plurality of polygons of the second polygonal mesh, each at least a first interior polygon, and each at least a second exterior polygon are triangles.

5. The method of claim 1, further comprising: copying color, textural information, or both from each bisected polygon of the first polygonal mesh to each corresponding at least a first interior polygon and at least a second exterior polygon.

6. The method of any claim 1, further comprising: filling a hole in the first polygonal mesh created by the extraction with filling geometry created from a boundary of the hole.

7. The method of claim 6, further comprising: copying color, textural information, or both from the boundary of the hole to the filling geometry.

8. A system for extracting data from a three-dimensional visual representation of a physical space, the three-dimensional visual representation of the physical space comprising a mesh of a plurality of polygons, the system comprising:
   a data storage;
   an electronic communication network; and
   a user device in electronic communication with the data storage over the electronic communication network, the user device adapted to:
      define an extraction polyhedron enclosed by a boundary surface, the boundary surface of the extraction polyhedron enclosing at least a portion of the plurality of polygons;
      define a second polygonal mesh that corresponds to the boundary surface of the extraction polyhedron, the second polygonal mesh having a plurality of polygons;
      identify a plurality of planes, each of the plurality of planes being coplanar with a corresponding one of the plurality of polygons of the second polygonal mesh, each of the plurality of planes having at least one point and a direction vector, each point being coplanar with a corresponding one of the plurality of polygons of the second polygonal mesh, each direction vector corresponding with a normal of each corresponding plane of the plurality of planes of the second polygonal mesh;
      bisect each one of the plurality of polygons of the first polygonal mesh that intersect with each at least one of the plurality of polygons of the second polygonal mesh with the corresponding plane of the corresponding at least one polygon of the second polygonal mesh, each intersecting one of the plurality of planes of the first polygonal mesh resulting in a corresponding at least a first interior polygon and a corresponding at least a second exterior polygon;
      test each polygon of the plurality of polygons of the first polygonal mesh to determine if each polygon of the first polygonal mesh is an interior polygon;
      extract each interior polygon; and
      store, in data storage, data relating to each extracted interior polygon.

* * * * *